Oct. 3, 1961 G. T. BOWMAN 3,002,529
VALVE POSITION INDICATOR
Filed April 29, 1957 2 Sheets-Sheet 2

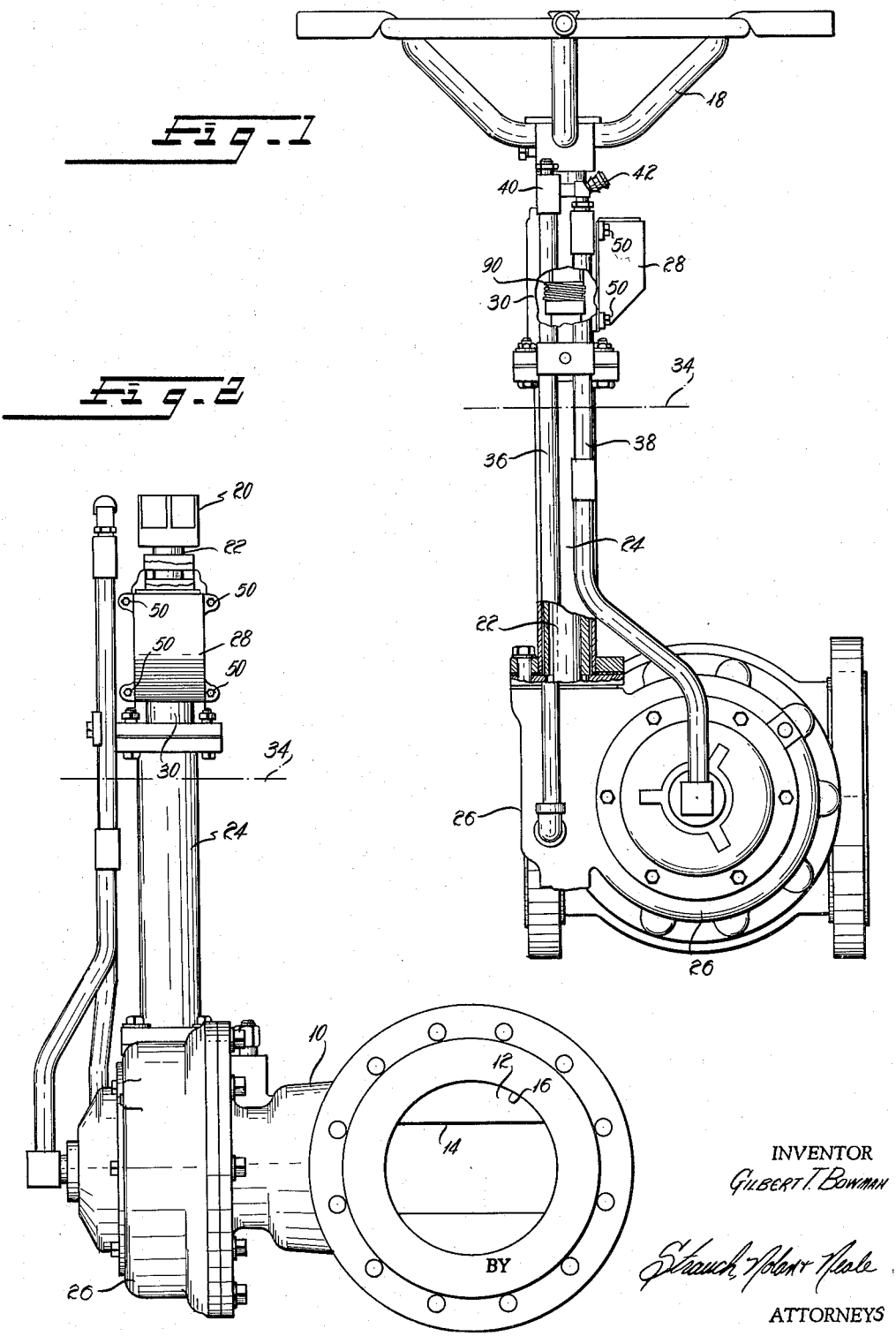

INVENTOR
GILBERT T. BOWMAN

BY
ATTORNEYS

United States Patent Office 3,002,529
Patented Oct. 3, 1961

3,002,529
VALVE POSITION INDICATOR
Gilbert T. Bowman, Bethel Park, Pa., assignor to Rockwell Manufacturing Company, Pittsburgh, Pa., a corporation of Pennsylvania
Filed Apr. 29, 1957, Ser. No. 655,643
7 Claims. (Cl. 137—553)

The present invention relates to improvements in valve position indicators and more particularly to valve position indicators for plug valves of the large capacity type equipped with manually actuated gear drive mechanisms.

While in plug valves only approximately a 90° rotation of the plug is required to move the plug between its open and closed positions, in large lubricated plug valves used in large capacity pipe lines, it is essential, in order to provide sufficient operating torque to move the plug to provide a reduction gear train between the handwheel or wrench actuated input shaft and the plug stem. When the pipeline is underground, the valve itself is buried along with the pipeline, with only the upper end of the valve operating mechanism and the fitting equipped ends of the lubricant supply conduits being located above ground. In such valves, a handwheel and/or wrench adapter is fixed to the upper end of an axially fixed rotatable input drive shaft which, through suitable gearing such as meshed bevel gears and meshed worm and worm wheel gearing is drive connected to the plug stem so that rotation of the shaft is imparted to the plug. In the past, in order to provide an indication of the position of the plug in valves of this type, it has been customary to provide an indicating scale fixed adjacent the input drive shaft and an indicator mounted on a nut which is constrained against rotation but threadedly received on a threaded portion of the input drive shaft so that rotation of the input drive shaft will raise or lower the indicator along the input shaft and relative to the indicating scale to provide an indication of the position of the plug. Such indicators have the basic disadvantage that they are visible only from the side of the input drive shaft so that an individual manipulating the handwheel at the end of the input drive shaft cannot read the indicator while he is manipulating the handwheel.

Since the pipelines in which valves of this type are used are usually located in the open where they are subjected continuously to the influence of atmospheric conditions such as rain, snow and ice and to the effect of sand and dirt, particularly in the very arid regions through which pipelines frequently pass, it is essential to maintain the operability of the valve and the accuracy of the indicator that the entire valve operator mechanism and the valve position indicator mechanism be enclosed within a sealed housing to protect these components from these conditions.

While many forms of valve position indicators have been provided in the past for globe and gate valves which provide an indication readable by the operator while he is manipulating the handwheel, since these valves are used in installations where the valve operating mechanism is not subjected to extreme atmospheric conditions or to the influence of sand and dirt, these prior art valves have not been equipped with sealed operating mechanisms and the indicators of which they are provided are not sealed units and they are not adaptable to be enclosed within sealed units.

Examples of such prior art structures are found in United States Letters Patent No. 588,010 issued August 10, 1897, to C. L. Quimby for Valve Registering Device; No. 684,191 issued October 8, 1901, to W. A. Chatham for Gate Valve Indicator; No. 1,264,282 issued April 30, 1918, to J. W. Dearing for Valve; No. 1,994,336 issued March 12, 1935, to J. W. Dawson for Valve Bonnet; No. 2,104,520 issued January 4, 1938, to D. D. Jackson et al. for Gauge; No. 2,646,767 issued July 28, 1953, to J. Hanson for Valve Position Indicator; and No. 1,778,583 issued October 14, 1930, to E. V. Bryant for Valve Position Indicator.

With the foregoing general discussion in view, it is the primary object of the present invention to provide, in a sealed gear operator equipped valve, a valve position indicating mechanism disposed within the sealed housing of the gear operator mechanism and drive connected to such mechanism and operative to provide a continuous indication of the position of the valve which is readily visible to an individual manipulating the input drive shaft for such operator mechanism.

A further object of the present invention is to provide a manually actuated gear operator equipped valve embodying a valve position indicator comprising a plural order reversible indicating revolution counter drive connected to the input shaft and mounted in the housing for such shaft in a position to be continuously visible by an individual manipulating a torque applying element such as a handwheel or wrench applied to the end of such shaft.

A more specific object of the present invention is to provide a manually actuated gear operator equipped plug valve having a sealed housing enveloping said operator and having a transparent portion facing in the direction of the torque input end of the input shaft of such operator and in which is disposed an indicator mechanism so drive connected to such input shaft as to provide a continuous indication of the position of the valve member of the valve visible through such transparent housing portion.

These and other objects of the present invention will become more fully apparent by reference to the appended claims and as the following detailed description proceeds in reference to the accompanying drawings wherein:

FIGURE 1 is a side elevational view, partially broken away and in section of the valve assembly of the present invention;

FIGURE 2 is an end view in elevation of the assembly of FIGURE 1;

Figure 3:
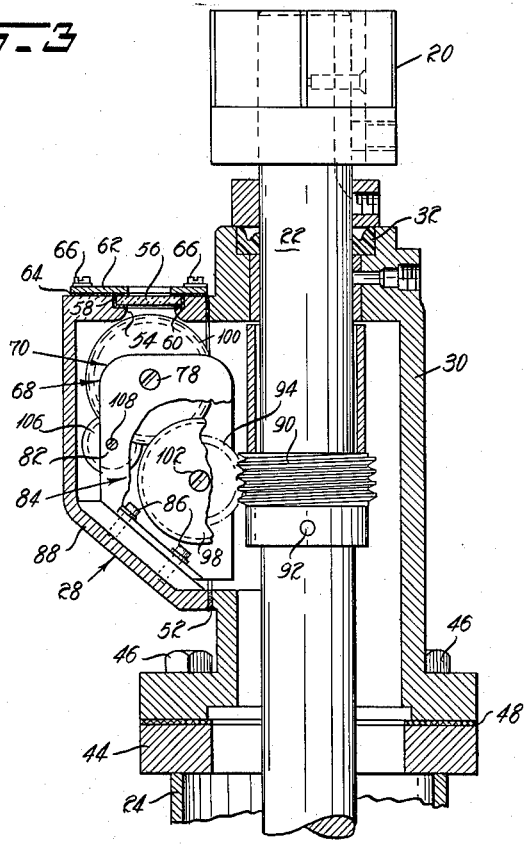
FIGURE 3 is a fragmentary sectional view of the assembly of FIGURE 1 illustrating in detail the arrangement of the valve position indicator mechanism.

Referring now to the drawings, and particularly to FIGURES 1 and 2, the gear operator equipped lubricated plug valve assembly therein illustrated embodying the principles of the present invention comprises a valve casing 10 having a tapered ported plug 12 rotatably mounted therein about a horizontal axis between open and closed positions in which its port 14 is in alignment with the horizontal through passage 16 of the valve casing 10 permitting fluid communication through the passage 16 and a position approximately 90 degrees offset from its open position in which the port 14 is out of alignment with the passage 16 and thereby precludes fluid communication through the passage 16. Rotary movement of the plug 12 is imparted by rotary manipulation of the handwheel 18 which is in driving engagement with an adaptor head 20 of polygonal cross section and keyed to the main input shaft 22 which extends downwardly through a housing extension 24 into a gear mechanism housing 26 which is fixed to the valve casing 10. A wrench may be similarly applied to head 20 to rotate shaft 22. A worm (not shown) is fixed to the lower end of shaft 22 and is in constant mesh with a worm wheel (not shown) disposed within gear casing 26 which is fixed to the stem of the plug 12. In certain geared valves, multi-stage gear reduction is provided as for example by the provision of a bevel gear reduction mechanism between the input drive shaft and the worm driving the worm wheel fixed to the valve plug stem.

The valve casing 10, the gear casing 26 and the housing extension 24 are rigidly bolted together and suitable gaskets are interposed between their mating faces to form a fluid tight and dust and dirt proof housing. An indicator mechanism housing, having two parts 28 and 30, is mounted in fluid tight and dust-proof relation to the top of the extension 24 and is equipped with an annular seal 32 (FIGURE 3) surrounding and engaging the shaft 22 to complete the fluid tight and dust-proof enclosure for the valve, its gear operator mechanism, its input shaft 22 and its position indicator.

As pointed out at the outset hereof, valves of this type are frequently interposed in an underground pipeline. The line 34 in FIGURES 1 and 2 indicates the ground level for a typical installation of a valve of this type. In such installations, lubricant conduits 36 and 38 are provided which are connected at their lower ends respectively to supply lubricant to the gear casing 26 and to the lubricant passages supplying lubricant to the seat between the plug 12 and the casing 10 in the conventional manner for lubricated plug valves, and which are equipped at their upper ends with conventional lubricant fittings 40 and 42, respectively, located above the ground level 34 to permit lubrication of the valve and its operator mechanism while installed below ground.

Referring specifically to FIGURE 3, the indicator housing member 30 surrounds shaft 22, is fixed at its lower end to the terminal flange 44 on the housing extension 24 by bolts 46 in fluid tight and dust-proof relationship therewith by a gasket 48 interposed therebetween, and is sealed at its upper end by sealing ring 32. Indicator housing member 28 is fixed to housing member 30 by bolts 50 (FIGURES 1 and 2). A gasket 52 is interposed between their mating faces to provide a seal therebetween.

The housing member 28 is provided with an upwardly facing opening 54 which is closed by a transparent member 56 forming a window, and a gasket 58 interposed between the transparent member 56 and the walls of the recess 60 about the opening 54. A retainer plate 62 and a gasket 64 interposed between plate 62 and the exterior surface of housing 28 and extending over the peripheral edge of the transparent member 56 are clamped to the housing 28 by screws 66. The gaskets 58 and 64 form a fluid tight and dust-proof seal between the housing 28 and the transparent member 56 and between the housing member 28 and the apertured retainer plate 62.

The indicator mechanism is generally indicated by the reference numeral 68 and consists of a plural order reversible intermediate pinion type carry mechanism indicating counter 70. The numeral wheels 72, 74 and 76 (FIGURE 4) are journalled upon a cross shaft 78 fixed between the spaced upstanding side plates 80 and 82 of a U-shaped bracket 84 fixed by screws 86 to the interior of the lower inclined wall 88 of the housing member 28. Counter mechanism 70 is driven from shaft 22 by a worm 90 fixed to shaft 22 within housing member 30 by a pin or set screw 92, a worm wheel 94 in constant mesh with worm 90 and fixed to one end of a sleeve 96 the opposite end of which carries a spur gear 98 which is in constant mesh with the input gear 100 fixed to the units order counter wheel 72. Sleeve 96 is journalled on a shaft 102 fixed to the U-shaped bracket 84 in spaced parallel relation to the shaft 78. The carry-over or transfer pinions 106 and 107 are journalled on shaft 108 which is fixed on bracket 84 in spaced parallel relation to shaft 78.

Figure 4:
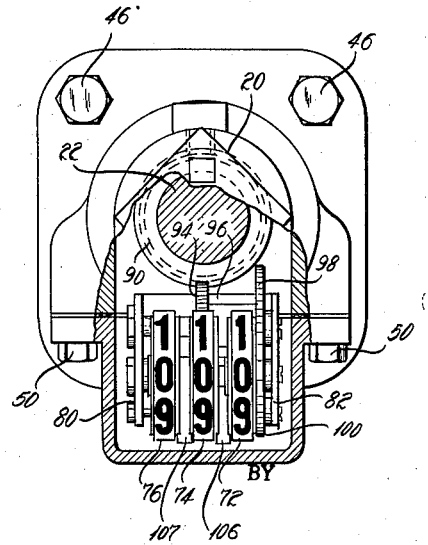
FIGURE 4 is a fragmentary top plan view partially in cross section showing the indicator mechanism.

As is clearly shown in FIGURES 3 and 4, the counter wheels 72, 74 and 76 are disposed below the transparent member 56 and are readily visible through the aperture of plate 62, transparent member 56 and the aperture 54 of housing member 28 by an individual manipulating shaft 22 by handwheel 18 or a wrench applied to adaptor 20. The counter mechanism as illustrated in FIGURES 3 and 4 is in its zero position corresponding to the fully closed position of the valve. Indicators are provided on the retainer plate 62 indicating the number of revolutions of the input shaft 22 which are necessary to fully open the valve so that the operator knows exactly the position of the plug 12 at all times.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In combination with a manually actuated gear-driven operator equipped plug valve in which a predetermined large number of revolutions of the input shaft of the operator are required to effect a quarter turn of the valve plug and having a sealed housing for the operator provided with an upwardly facing transparent window, a reversible indicating plural order revolution counter mounted on the valve operator beneath said window in a position visible through such window and geared to the input shaft thereof by a ten to one reduction gear train to count the revolutions of and thereby indicate the position of said shaft relative to one of its limit positions as determined by the open and closed positions of said valve.

2. In combination with a manually actuated gear drive operator equipped plug valve assembly embodying a valve member movable between open and closed positions, an input shaft adapted at one end to be operatively engaged by a torque applying element and drive connected at the other end to said valve member through a gear train such that a predetermined plurality of revolutions of said input shaft are required to move said valve member between its open and closed positions and a sealed housing for the major portion of said shaft and said shaft drive connection; a plural order reversible indicating counter means mounted on said assembly in said housing and having its units order drive connected to said operator input shaft through a ten to one reduction mechanism to continuously indicate the number of revolutions said input shaft is from one of its limit positions and thereby indicate the position of said valve, said counter means having an indicating portion disposed substantially in a plane interconnecting the axis of rotation of said shaft, located intermediate said shaft one end and the valve of said assembly, said housing having a transparent window disposed between said shaft one end and said indicating portion whereby said indicating portion is visible by an individual while manipulating a torque applying element engaged with said shaft one end whereby a continuous valve position indication is presented to an individual manipulating said shaft.

3. In combination with a sealed operator equipped valve assembly embodying a valve member movable between open and closed positions, an input drive shaft, reduction gearing drive connecting said input shaft and said valve member such that a predetermined plurality of revolutions of the input shaft are required to move said valve member between its fully open and fully closed positions, and a sealed housing enclosing said gearing and a portion of said shaft; indicating reversible plural order revolution counter means disposed within said housing, drive connected to said drive shaft by a reduction drive train such that each revolution of said drive shaft effects one tenth of a revolution of the units order of said counter means and operative to continuously indicate the number of said predetermined plurality of revolutions said drive shaft has been rotated from a predetermined one of the limit positions of said valve member and thereby indicate the position of said shaft relative to its limit positions of rotation corresponding to the valve open and closed positions respectively, said housing having a transparent window adjacent said counter means to permit reading of the indication of said counter means.

4. In combination with a plug valve assembly embodying a plug valve member movable through a quarter turn between open and closed positions, an input drive shaft, and reduction gearing drive connecting said input shaft and said valve member such that a predetermined plurality of revolutions of said input drive shaft are required to effect a quarter turn of said valve member, indicating reversible plural order revolving counter means having its units order drive connected to said drive shaft through a ten to one reduction mechanism and operative to continuously indicate the number of revolutions required to rotate said shaft to one of its limit positions and thereby indicate the position of said shaft within the range of said predetermined plurality of revolutions relative to its limit positions of rotation corresponding to the valve open and closed positions respectively, means mounting said counter means on said assembly to position it for reading from the end of said shaft remote from said valve and means including a transparent wall enclosing and sealing said counter means and its drive connection to said drive shaft against the influence of atmospheric conditions and foreign particles.

5. The combination defined in claim 4 wherein the drive connection between said counter and said shaft comprises a gear train embodying a worm fixed for rotation with said shaft and a worm wheel meshing with said worm and drive coupled to the input of said counter.

6. The combination defined in claim 4 wherein said counter comprises a plural order reversible indicating counter mechanism embodying intermediate pinion type carry mechanisms between adjacent denominational orders.

7. In combination with a valve and valve operator embodying a torque multiplying gear train having an input and output drive connected to the movable member of said valve; a universally applicable valve position indicating operator input assembly comprising a rotatable input member connected to the input of said gear train, a reversible plural order indicating revolution counter having a plurality of coaxial counter wheels each adjacent pair of which is interconnected by a carryover mechanism such that each revolution of the lower order wheel imparts a tenth of a revolution to the next adjacent higher order wheel, and means having a ten to one reduction ratio drive connecting the lowest order of said counter to said operator input member whereby each revolution of said input member imparts a tenth of a revolution to said counter lowest order so that the indication of said counter wheels accurately indicates the rotative position of said input member relative to its limit positions corresponding to the fully open and fully closed positions of said valve irrespective of the number of revolutions of said input member required to move said movable valve member between its fully opened and fully closed positions.

References Cited in the file of this patent

UNITED STATES PATENTS

| 412,644 | Meyer | Oct. 8, 1889 |
| 580,252 | Christie | Apr. 6, 1897 |
| 2,456,101 | Yeasting | Dec. 14, 1948 |
| 2,693,317 | Demeulenaere | Nov. 2, 1954 |

FOREIGN PATENTS

| 704,861 | Germany | Apr. 9, 1941 |

OTHER REFERENCES

Nordstrom Valves (catalog No. 10), 1951, pp. 154–155. (Commerce Library.)

UNITED STATES PATENT OFFICE
CERTIFICATE OF CORRECTION

Patent No. 3,002,529                           October 3, 1961

Gilbert T. Bowman

It is hereby certified that error appears in the above numbered patent requiring correction and that the said Letters Patent should read as corrected below.

Column 4, line 52, for "interconnecting" read -- intersecting --; column 5, line 16, for "revolving" read -- revolution --.

Signed and sealed this 8th day of May 1962.

(SEAL)
Attest:

ERNEST W. SWIDER                           DAVID L. LADD
Attesting Officer                              Commissioner of Patents